Jan. 19, 1926.

J. A. MELANCON 1,570,269

CANE HARVESTER

Filed Sept. 29, 1923     2 Sheets-Sheet 2

Fig. 2.

J. A. Melancon, Inventor

By C. A. Snow & Co.

Attorneys

Patented Jan. 19, 1926.

1,570,269

UNITED STATES PATENT OFFICE.

JOSEPH A. MELANCON, OF DONALDSONVILLE, LOUISIANA.

CANE HARVESTER.

Application filed September 29, 1923. Serial No. 665,667.

*To all whom it may concern:*

Be it known that I, JOSEPH A. MELANCON, a citizen of the United States, residing at Donaldsonville, in the parish of Ascension and State of Louisiana, have invented a new and useful Cane Harvester, of which the following is a specification.

This invention relates to a machine for harvesting cane and is designed more especially as an improvement upon the structure disclosed in Patent No. 839,945 issued on January 1st, 1907.

One of the objects of the invention is to provide a machine of this character with opposed groups of strippers, certain of the strippers of each group operating to strip the cane while standing while the remaining strippers of each group operate to remove the cane tops as fast as they are severed by the top cutters of the machine.

A further object is to improve upon the structure of the machine by rendering the top cutting mechanism more substantial and efficient by the use of additional supports and guides.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Fig. 2 is a top plan view of the front portion of the machine.

Figure 1:
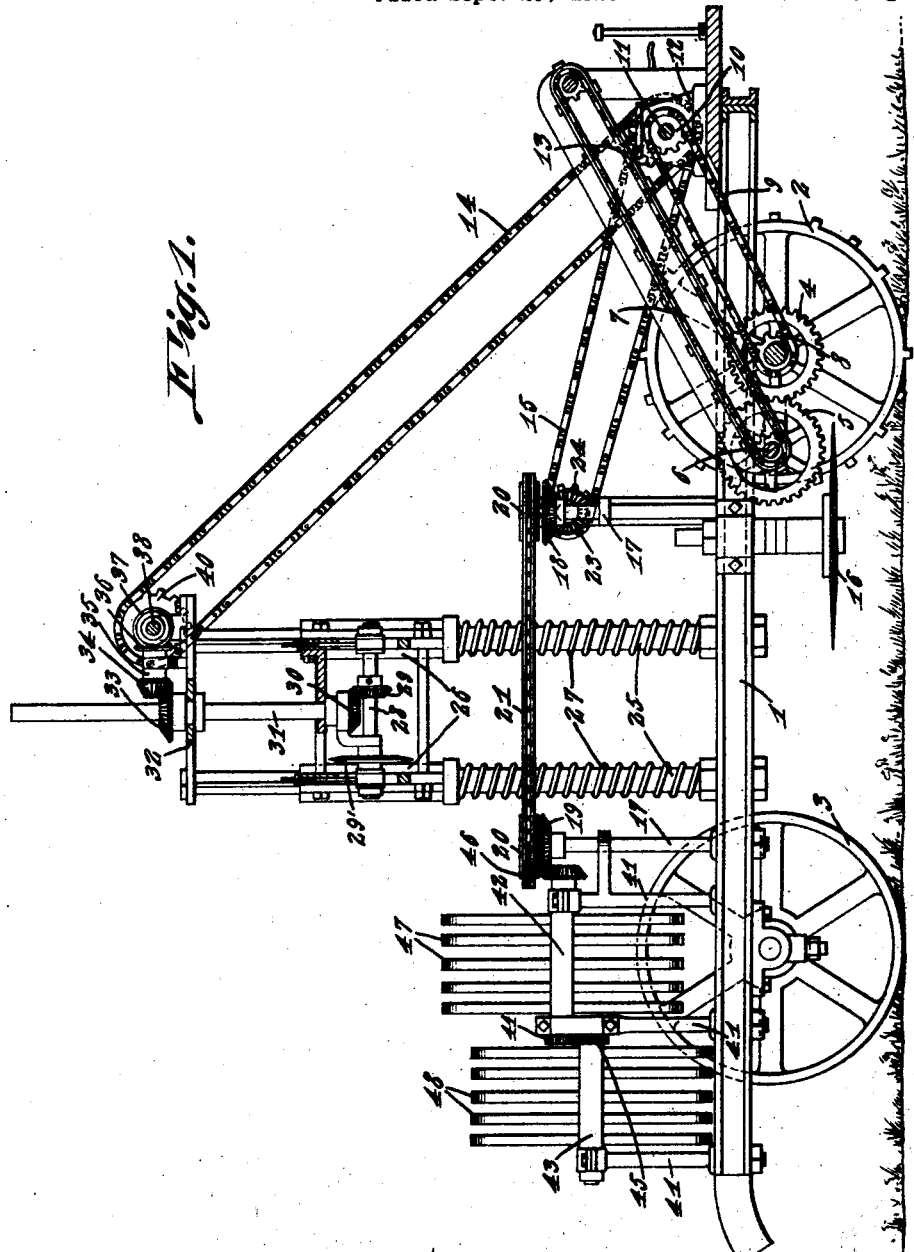
Fig. 1 is a vertical longitudinal section through the machine, said section being taken on the line 1—1 Figure 2.

Referring to the figures by characters of reference 1 designates the main or supporting frame of the machine provided with front wheels 3 and rear wheels 2, there being a gear 4 rotatable with the rear wheels and adapted to drive a gear 5 secured to a transverse shaft 6. This shaft carries an endless elevator 7 such as disclosed in our patent hereinbefore mentioned. A sprocket 8 rotates with the wheels 2 and is adapted to be driven by a chain 9 receiving motion from a sprocket 10 secured to the shaft 11 of a motor 12. Shaft 11 also has a sprocket 13 designed to operate an endless chain 14 and another endless chain 15 is similarly driven by the motor.

A suitable arrangement of disk cutters, one of which has been indicated at 16, is provided adjacent the wheels 2.

Upstanding structures are provided on the sides of the frame 1 as indicated at 17 and mounted thereon are rotatable gears 18 and 19 having sprockets 20 connected thereto and rotatable therewith. These sprockets support endless chains 21 provided with laterally extending fingers 22. A gear 23 meshes with each gear 18 and has a sprocket 24 rotatable therewith and engaged by the chain 15. The structure thus far described has already been disclosed in our patent hereinbefore referred to, and, in itself, constitutes no part of the present invention.

Fixedly connected to and upstanding from each side of the main frame 1 and between the chains 21 are parallel tubular uprights 25 on which is mounted a cross head 26 yieldingly supported by springs 27 mounted on the uprights. This cross head is operated and is of substantially the same construction as the one disclosed in our patent hereinbefore referred to and has longitudinal shafts 28 journaled therein and provided with lapping cutting disks 29′ rotatable in substantially vertical planes. Each shaft 28 is provided with a gear 29 meshing with a gear 30 on a vertical shaft 31 and these shafts are slidable in a top plate or table 32 fixedly mounted on the upper ends of the uprights 25.

Each shaft 31 is feathered in a gear 33 swiveled in the top plate or table 32 and each of these gears 33 meshes with a gear 34 carried by a shaft 35 journaled on the top plate or table. Another gear 36 is secured to each shaft 35 and these gears 36 mesh with corresponding gears 37 secured to a transverse shaft 38 journaled on the top plate or table 32. A sprocket 40 is also secured to the shaft 38 and is engaged and driven by chain 14.

The structure last described is substantially similar to that disclosed in our patent hereinbefore referred to with the exception that instead of providing a single upright or standard at each side of the machine, a pair of standards or uprights is provided at each side. Thus the cross head 26 is more efficiently operated and will not bind as in the old construction and the entire structure is rendered more durable as well as efficient. The cross head can be adjusted vertically by the means disclosed in our patent herein mentioned or in any other suitable manner and the mechanism carried by this cross head is designed to shift upwardly and downwardly automatically under the action of the stalks passing thereunder and to cut off the tops of the stalks. These features in themselves are no part of the present invention but have already been disclosed in our prior patent.

An improvement of considerable importance is provided at the front end of the machine. This includes guide supports 41 and journaled in these supports at each side of the frame are nonalining longitudinal shafts 42 and 43, there being a gear 44 at the front end of the upper shaft 42 that constantly meshes with gear 45 on the rear end of the lower shaft 43. Gears 46 are provided at the rear ends of the shafts 42 and mesh with the gears 19. A series of stripping arms 47 are provided on each shaft 42 and a series of stripping arms 48 are provided on each shaft 43. It will be apparent that when the machine is driven forward the stripping arms 48 will act to strip the canes that are standing, the said arms rotating inwardly and downwardly. At the same time the arms 47 rotate in the opposite direction and comb upwardly between the stalks. The fingers 22 pull the cane stalks back so as to bend them beneath the cutters 29' and cause the cane tops, which are thus extended forwardly, to be severed. These tops, when severed, will drop into the paths of the arms 47 which act to throw laterally the cane tops severed by the cutters 29'. Thus the machine is rendered more efficient, first, by the action of the cane strippers 48 in stripping the standing cane, and, second, by the delivery of the severed tops through the action of the arms 47.

What is claimed is:—

The combination with a portable frame and top severing means carried thereby, of oppositely rotatable shafts adjacent each side of the frame and in front of the top severing means, means for actuating all of the shafts simultaneously, and means on one shaft at each side of the frame for stripping standing canes and upon the other shaft at each side of the frame for laterally delivering severed cane tops.

In testimony that I claim the foregoing as my own, I have hereto affixed my signature.

JOSEPH A. MELANCON.